(12) United States Patent
Tajiri

(10) Patent No.: US 7,434,939 B2
(45) Date of Patent: Oct. 14, 2008

(54) ILLUMINATION APPARATUS, IMAGE PRODUCTION APPARATUS, AND ILLUMINATION LIGHT PROFILE CONTROLLING METHOD

(75) Inventor: Shinichiro Tajiri, Kanagawa (JP)

(73) Assignee: Sony Corporation, Tokyo (JP)

( * ) Notice: Subject to any disclaimer, the term of this patent is extended or adjusted under 35 U.S.C. 154(b) by 109 days.

(21) Appl. No.: 11/107,220

(22) Filed: Apr. 15, 2005

(65) Prior Publication Data

US 2005/0237493 A1 Oct. 27, 2005

(30) Foreign Application Priority Data

Apr. 22, 2004 (JP) ............................ P2004-127183
Sep. 1, 2004 (JP) ............................ P2004-254426

(51) Int. Cl.
*G03B 21/14* (2006.01)
(52) U.S. Cl. ............................ 353/85; 362/210; 362/555
(58) Field of Classification Search .................. 353/85, 353/87, 30, 101, 102; 362/552, 210, 555
See application file for complete search history.

(56) References Cited

U.S. PATENT DOCUMENTS

| | | | | |
|---|---|---|---|---|
| 4,988,188 A | * | 1/1991 | Ohta ............................ 353/122 |
| 5,860,721 A | * | 1/1999 | Bowron et al. ............... 353/101 |
| 6,183,094 B1 | * | 2/2001 | Ohta ............................ 353/38 |
| 6,283,599 B1 | * | 9/2001 | Lin ............................. 353/101 |
| 6,953,268 B2 | * | 10/2005 | Kimura et al. ............... 362/268 |
| 7,014,323 B2 | * | 3/2006 | Kobayashi et al. ............ 353/69 |
| 7,040,761 B2 | * | 5/2006 | Okuyama et al. ............. 353/38 |
| 7,111,946 B2 | * | 9/2006 | Abe et al. ...................... 353/97 |
| 2003/0223248 A1 | * | 12/2003 | Cronin et al. ............... 362/555 |
| 2004/0114112 A1 | * | 6/2004 | Kim et al. ..................... 353/31 |
| 2005/0024592 A1 | * | 2/2005 | Eguchi ........................ 353/30 |

* cited by examiner

Primary Examiner—William C Dowling
(74) Attorney, Agent, or Firm—Sonnenschein Nath & Rosenthal LLP

(57) ABSTRACT

An illumination apparatus and an image production apparatus including a plurality of laser beams are disclosed wherein a variation of the intensity distribution caused by a secular change or the like can be compensated to obtain illumination light having a high degree of uniformity even if some laser beam exhibits a drop in intensity or misses. The illumination apparatus includes a light source section including a laser light source, an optical system into which a plurality of laser beams are introduced, and a detection section for directly or indirectly detecting a light intensity distribution on a focal plane of the optical system. The illumination apparatus further includes an adjustment section for varying the light intensity distribution on the focal plane based on the detection information of the detection section.

7 Claims, 18 Drawing Sheets

ILLUMINATION APPARATUS, IMAGE PRODUCTION APPARATUS, AND ILLUMINATION LIGHT PROFILE CONTROLLING METHOD

BACKGROUND OF THE INVENTION

This invention relates to a technique for overcoming an evil effect arising from the non-uniformity of illumination light caused by a secular change, individual differences and so forth in an application of an illumination apparatus in which a laser light source is used and an image production apparatus such as a projector or a printer in which an illumination apparatus of the type mentioned is used.

An optical system is known which uses a plurality of laser light sources or a plurality of laser beams to implement illumination of a uniform light intensity distribution. Where an optical system of the type described is applied, for example, to an image display apparatus of the projection type, a linear beam is illuminated on an optical modulation element of the one-dimensional spatial modulation type. The optical modulation element modulates the light to obtain a one-dimensional image. The one-dimensional image is scanned along a direction perpendicular to the one-dimensional direction by a light scanning mechanism such as a galvanometer and projected on a screen to form a two-dimensional image. It is to be noted that, as one of optical modulation elements of the one-dimensional spatial modulation type, for example, a grating light valve device (hereinafter referred to simply as "GLV" (trademark) device) developed by Silicon Light Machines (SLM) (trademark), United States, can be listed. The GLV device is formed from reflection type diffraction gratings, and a plurality of movable ribbons are disposed at predetermined distances while a fixed ribbon is disposed between each adjacent ones of the movable ribbons. When a driving voltage is applied between a common electrode and the movable ribbons, the movable ribbons are moved to form diffraction gratings to incident light.

In illumination on such a one-dimensional optical modulation element as described above, it is necessary for the light intensity to be uniform within a predetermined range ("top hat"-shaped distribution). A design technique for uniformization of the light intensity is disclosed, for example, in Japanese Patent Laid-Open No. 2003-218017 (hereinafter referred to as Patent Document 1). According to the design technique disclosed in Patent Document 1, where a laser array light source and a fly-eye lens are used to achieve uniform illumination, in order to enhance the uniformity of the intensity distribution even where the divisional number of the fly-eye lens is an exact devisor of the laser array number, spatial phases of profiles of laser array light incident to the lens arrays are made different from each other.

SUMMARY OF THE INVENTION

Incidentally, in the design of an illumination optical system described above, it is assumed that characteristics regarding emitters of the individual laser light sources and the laser arrays are in an ideal state, that is, the laser light sources and the laser arrays do not have a dispersion in individual differences and characteristics and ideal Gaussian beams are outputted.

However, although it is presupposed to design a plurality of laser light sources and laser arrays with a same characteristic and with a same performance, actual lasers have various characteristics, and therefore, it is necessary to pay sufficient attention to the presence of individual differences and so forth. For example, where one-dimensional illumination light obtained by making a plurality of laser beams overlap with each other is illuminated upon an optical modulation element, characteristics of the individual lasers are reflected as they are on the intensity distribution. Therefore, in order to achieve the uniformity with regard to the light intensity distribution (illumination light profile) of illumination light, it is necessary to implement a top-hat-shaped distribution for a near field pattern of the lasers.

Further, a countermeasure is required against a secular change of the characteristics of a laser and an optical system and against an unexpected drop or stopping of the laser output power and so forth. In particular, it becomes a matter that, only if setting, initial adjustment and so forth are presumed at the stage of design of an optical system, a sufficient countermeasure cannot be taken against the non-uniformity of illumination light, variation of the illumination light profile and so forth caused by a secular change and so forth. In other words, shortage of the intensity, deterioration of the picture quality and so forth are invited.

It is an object of the present invention to provide an illumination apparatus and an image production apparatus including a plurality of laser beams wherein a variation of the intensity distribution caused by a secular change or the like can be compensated for to obtain illumination light having a high degree of uniformity.

In order to attain the object described above, according to an aspect of the present invention, there is provided an illumination apparatus, including a light source section including a laser light source, an optical system into which a plurality of laser beams are introduced from the light source section, a detection section for detecting a light intensity distribution on a focal plane of the optical system, and an adjustment section for varying the light intensity distribution on the focal plane based on the detection information of the detection section to uniformize the light intensity distribution.

According to another aspect of the present invention, there is provided an image production apparatus, including a light source section including a laser light source, an optical system into which a plurality of laser beams are introduced from the light source section, an optical modulation element used for modulation of light from the optical system, a detection section for detecting a light intensity distribution of illumination light on the optical modulation element or projection light after passing the optical modulation element, and an adjustment section for varying the light intensity distribution of the illumination light on the optical modulation element based on the detection information of the detection section to uniformize the light intensity distribution.

According to a further aspect of the present invention, there is provided an illumination light profile controlling method adapted, where a plurality of laser beams are obtained from a light source section including a laser light source and are outputted through an optical system, to uniformize the light intensity distribution on a focal plane of the optical system, including the steps of acquiring detection information of the light intensity distribution on the focal plane, and varying the light intensity distribution by adjustment of the optical system or adjustment of the output powers of the laser light source based on the detection information.

With the illumination apparatus, image production apparatus and illumination light profile controlling method, since adjustment relating to the light intensity distribution is performed based on the detection information, the illumination light can be prevented from being rendered significantly non-uniform by a secular change or the like.

Further, the illumination apparatus, image production apparatus and illumination light profile controlling method can cope with a variation of the intensity distribution caused by a secular change, a miss of a beam or the like, and can enhance the uniformity of the illumination light. Further, the illumination apparatus, image production apparatus and illumination light profile controlling method are effective for moderation of an optical influence and for assurance of a performance.

Where the illumination apparatus or the image production apparatus is configured such that the adjustment section changes the position or the posture of an optical element which composes the optical system, the position or the posture of the optical element may be adjusted. In this instance, the illumination apparatus may be configured such that the optical system includes a front group formed from a lens array and a relay lens system of a rear group, and the adjustment section changes the position of a component lens of the rear group along an optical axis to vary an overlapping state of images formed by the lens array. This configuration eliminates the necessity for an optical element for exclusive use for adjustment. Alternatively, the illumination apparatus or the image production apparatus may be configured such that the adjustment section changes the position of a beam diverging lens disposed in the relay lens system. The configuration is effective for reduction of the adjustment amount and so forth.

The illumination apparatus or the image production apparatus may be configured such that the adjustment section changes the incident positions of the laser beams to the optical system. With the configuration, the incident position of each beam can be adjusted individually, and this is effective for reduction of the loss.

Preferably, the adjustment section changes the position or the posture of an optical element which is disposed between the laser light source and the optical system. The configuration is effective for simplification of the adjustment mechanism.

Preferably, the adjustment section changes outputs of the laser light sources individually based on characteristic data of the lasers stored in advance or detection data of profiles of individual lasers by the detection section. The configuration allows finer adjustment.

Where the present invention is applied to an image production apparatus which is configured using a laser light source and an optical modulation element, it is significant to assure a high degree of uniformity of illumination light on the optical modulation element. The non-uniformity of illumination light results in a low coefficient and makes a cause of an obstacle to achievement of a high luminance. Further, where the image production apparatus is applied to a display apparatus or the like, such a disadvantage that a sufficient dynamic range cannot be assured is invited. The present invention makes implementation of a high performance, enhancement of the picture quality and so forth possible.

In summary, the present invention makes it possible to obtain illumination light of a high degree of uniformity using a plurality of laser beams and adjust the light intensity distribution so as not to become significantly non-uniform even if the output power of laser light sources drops as a result of a secular change or an output of some of the laser light sources stops. The present invention can be applied to image display apparatus of the front projection type or the rear production type, image outputting apparatus such as a printer and like apparatus wherein a one-dimensional image formed, for example, by an optical modulation element of the one-dimensional spatial modulation type is scanned by a light scanning mechanism such as a galvanometer to form a two-dimensional image and the two-dimensional image formed in this manner is displayed by projection or printed.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

Figure 1:
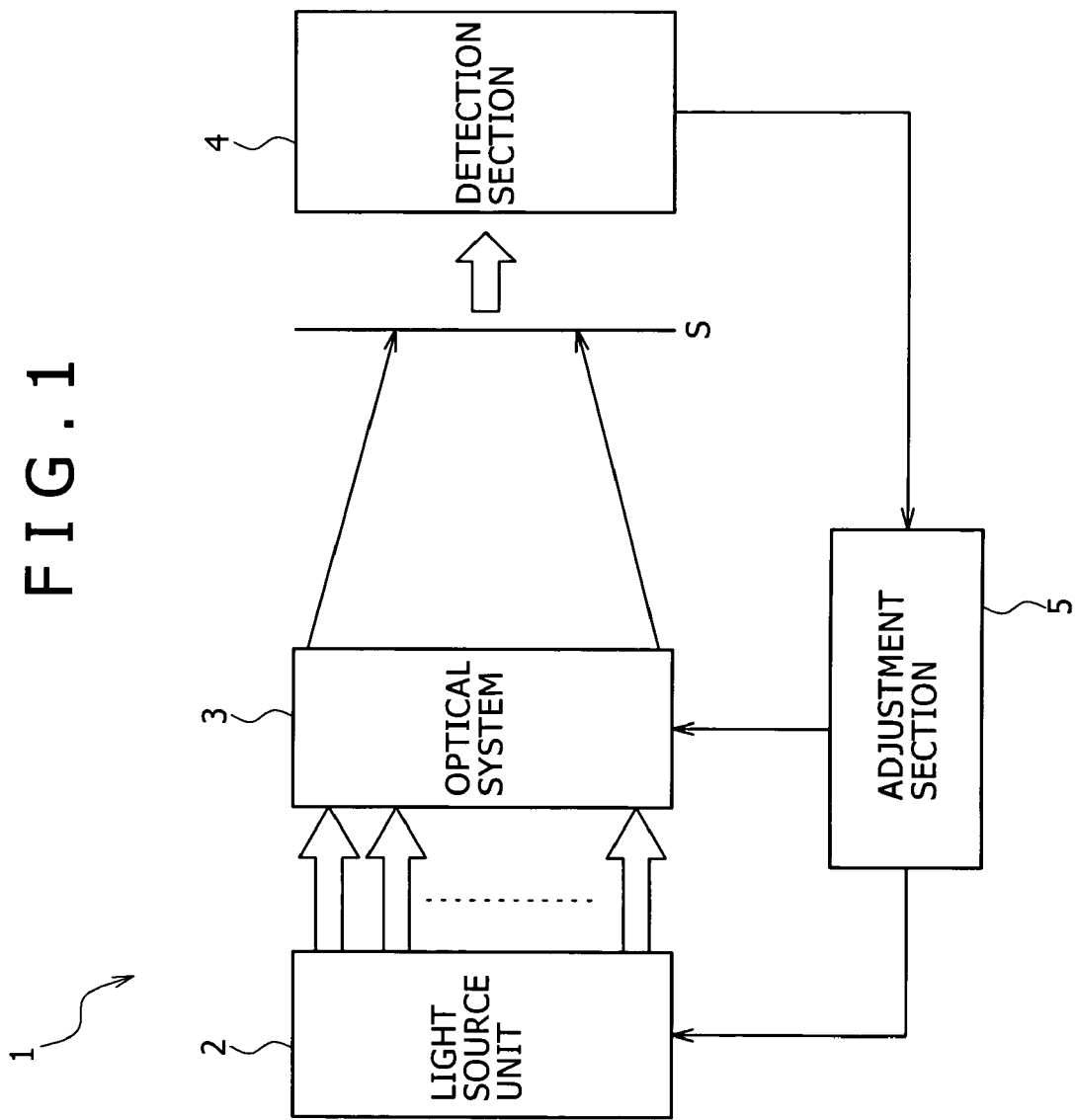
FIG. 1 is a block diagram showing an example of a basic configuration of an illumination apparatus to which the present invention is applied.

Referring to FIG. 1, there is shown a basic configuration of an illumination apparatus to which the present invention is applied. The illumination apparatus 1 shown includes a light source section 2, an optical system 3, a detection section 4, and an adjustment section 5.

The light source section 2 includes a laser light source such as a semiconductor laser or a solid-state laser and outputs a plurality of laser beams. For example, any of the following configurations may be adopted for the light source section 2:

A configuration wherein plurality of laser light sources are disposed and each outputs one or a plurality of laser beams; and Another configuration wherein a single laser light source, for example, a semiconductor laser array or the like wherein a plurality of emitters (radiation sources) are arrayed in a fixed direction, is used to output a number of laser beams equal to the number of emitters.

In this manner, according to the present invention, where a plurality of laser beams are used, since the laser light source is not limited to a specific form in terms of the arrangement and so forth, there is a high degree of freedom in design.

After the plural laser beams from the light source section 2 are sent to the optical system 3, illumination light having a high degree of uniformity is obtained on a focal plane of the optical system 3. It is to be noted that the focal plane corresponds, for example, to an illuminated surface of a one-dimensional optical modulation element, and the light is illuminated with a uniform intensity distribution over a predetermined range in a one-dimensional direction, that is, in a major axis direction of the element.

The detection section 4 is provided for directly or indirectly detecting the light intensity distribution on the focal plane. In particular, the detection section 4 is disposed on or in the proximity of the focal plane (refer to reference character S in FIG. 1) to perform profile detection regarding the light intensity distribution of the illumination light or profile detection is performed by the detection section 4 from an image obtained through an optical system not shown after such image formation. Whichever one of the forms is used, a difference from a target characteristic can be grasped from the detection information. It is to be noted that, while the detection section 4 may be formed, for example, from an integrating sphere and a photo sensor or using a photodiode (PD) array, in an application of the present invention, the detection section 4 may have any configuration or form.

The adjustment section 5 is provided to perform optical adjustment or output adjustment of the light source section 2 so that the light intensity distribution detected by the detection section 4 may be a uniform distribution. The adjustment section 5 thus cooperates with the detection section 4 to form a correction section for recovering a uniform light intensity distribution through correction so that the light intensity distribution may not be brought into an extremely non-uniform state by a secular change and so forth. In particular, the adjustment section 5 changes the light intensity distribution on the focal plane or maintains, if the light intensity distribution is uniform, the state based on the detection information of the detection section 4.

The adjustment for making the intensity distribution regarding the profile of illumination light uniform may have, for example, the following forms:

(A) Optical adjustment;
(B) Adjustment of the optical output; and
(C) Joint use of (A) and (B).

It is to be noted that the form (A) is effective, for example, in periodical adjustment and adjustment performed upon maintenance and so forth of the apparatus, and the form (B) is effective in adjustment while the apparatus is being used and adjustment which is performed in a normal state. Further, as regards the form (C), a form of the combination of the forms (A) and (B) may be such that the form (A) is used for rough adjustment and the form (B) is used for fine adjustment, and it is possible to take a safety measure when one of the forms (A) and (B) is placed into incompetence or the like.

The following forms are available as the form (A):

(I) A form wherein an optical element which composes the optical system 3 is adjusted;
(II) A form wherein the introduction position of a laser beam into the optical system 3 is adjusted;
(III) A form wherein an optical element disposed between the light source section 2 and the optical system 3 is adjusted; and
(IV) A form wherein two or more of the forms (I) to (III) are combined.

First, the form (I) is described.

Figure 2:
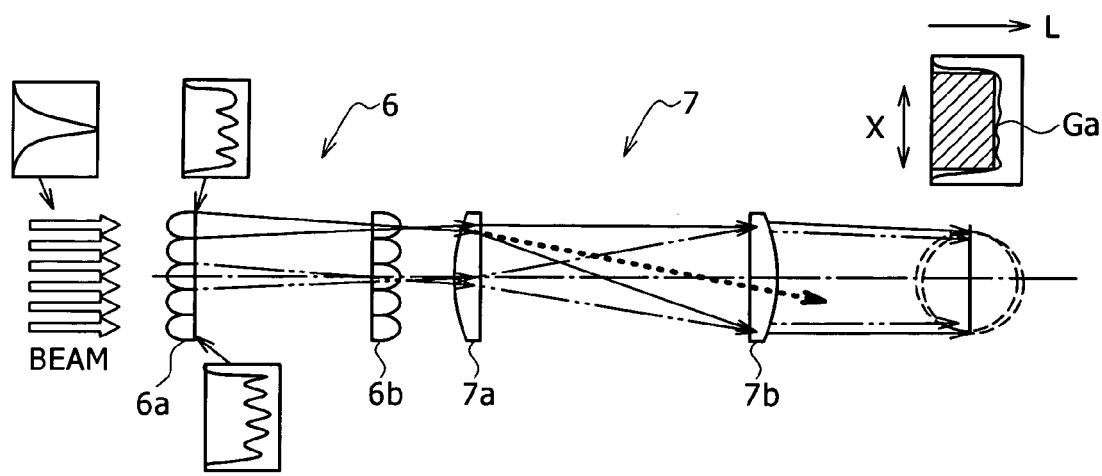
FIG. 2 is a schematic view illustrating an optical system for implementing uniform illumination using a lens array.

FIG. 2 shows the optical system 3 which uses a lens array to implement uniform illumination and includes a front group 6 including lens arrays 6a and 6b and a relay lens system 7 of a rear group.

Referring to FIG. 2, a plurality of arrow marks indicated by thick lines on the left side represent a laser beam column (beam stack) (a broken line represents a principal ray). The laser beams are introduced into the lens array 6a at the front stage while they are arranged in an upward and downward direction in FIG. 2. It is to be noted that, although the profile of each laser beam ideally has a Gaussian distribution, because there actually exist a dispersion in characteristic among the individual laser light sources, a dispersion in characteristics of the emitters of the laser array and so forth, generally the profiles of the individual beams are irregular.

The lens arrays 6a and 6b form an integrator, and the lens array 6a at the front stage has lens elements convex leftwardly while the lens array 6b at the rear stage has lens elements convex rightwardly.

After the beams condensed by the lens array 6a pass the lens array 6b, they reach an illumination object element (for example, a one-dimensional optical modulation element) on the focal plane S through the relay lens system 7. It is to be noted that, in the present example, there is no necessity to set the number (array number) of divisional pieces on the lens arrays to a particular function (for example, an exact divisor relationship) with respect to the number of laser beams, and therefore, the degree of freedom in optical design is high.

Of lenses 7a and 7b which compose the relay lens system 7, the lens 7a at the front side is convex leftwardly while the lens 7b at the rear side is convex rightwardly. Emergent light of the lens 7b is illuminated upon the illumination object element after the angle with respect to the optical axis is adjusted so as to be parallel to the utmost so that the incident angle to the illumination object element may be uniform. In particular, where an application to a device with which the incident angle range to the illuminated surface matters such as a GLV device is taken into consideration, for example, in order to assure a sufficiently high contrast after schlieren filtering, it is practically preferable to suppress the incident angle to the GLV device within a predetermined range (for example, within ±0.3 degrees).

In the arrangement shown in FIG. 2, when beams are inputted from the left side in FIG. 2, images formed by the lens array 6a on the incident side overlap with each other on the focal plane S as representatively by solid lines and alternating long and two short dashes lines in FIG. 2 to achieve uniform illumination on the illumination object element.

In a profile of the illumination light schematically shown at a right upper portion in FIG. 2, the "x axis" indicates an axis extending in the vertical direction (corresponding to the major axis of the one-dimensional optical modulation element, that is, to a position coordinate axis in the direction of the array of pixels) and the "L axis" indicates the light intensity axis.

A graph line Ga which represents the light intensity distribution indicates that the light intensity is substantially fixed in the x-axis direction and exhibits an intensity drop at peripheral portions thereof (a range indicated by slanting lines in FIG. 2 represents a portion of the light which is utilized effectively). This indicates a result that the profiles of incident light to the lens elements spatially overlap sufficiently with each other.

The reason why such a uniform condition as just described is not always maintained is that the intensity decreases as a result of a secular change of the incident beams or a laser is placed into a turned-off state. If the profile of the illumination light varies, then there is the possibility that the uniformity of illumination upon the illumination object element may be deteriorated significantly.

Figure 3:
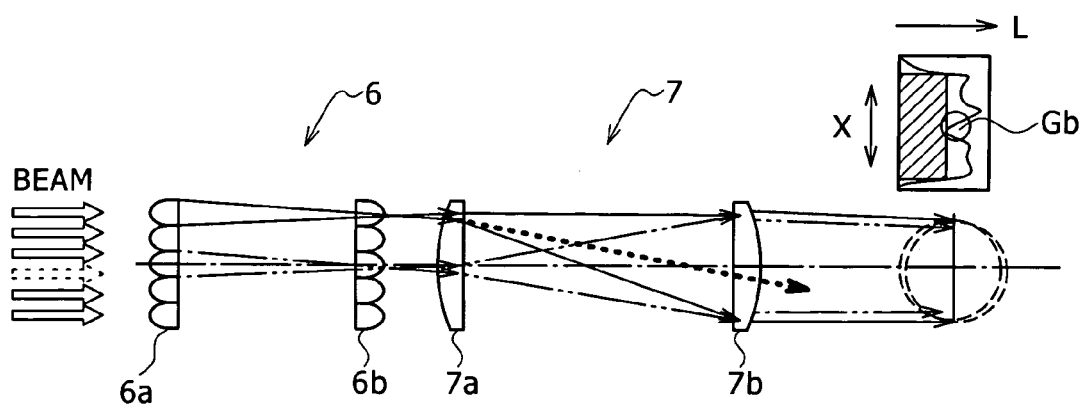
FIG. 3 is a similar view but illustrating a manner in which a drop of the intensity of a laser beam or a variation of a beam profile occurs.

FIG. 3 illustrates a manner wherein an intensity drop or a variation of a beam profile occurs with regard to a laser beam indicated distinguishably by a broken line arrow mark on the left side in FIG. 3.

In a profile of the illumination light schematically shown at a right upper portion in FIG. 3 (the x axis and the L axis are such as described hereinabove with reference to FIG. 2), a graph line Gb exhibits a drop of the intensity at a portion indicated within a broken line circular framework in the x-axis direction. In particular, if a partial drop of the intensity occurs, then this gives rise to non-uniformity of the illumination light (the amount of light which can be utilized effectively decreases as seen from a range indicated by slanting lines in FIG. 3).

Therefore, the position or the posture of an optical element which composes the optical system 3 is changed by the adjustment section 5 to correct the non-uniformity of the illumination light.

Figure 4:
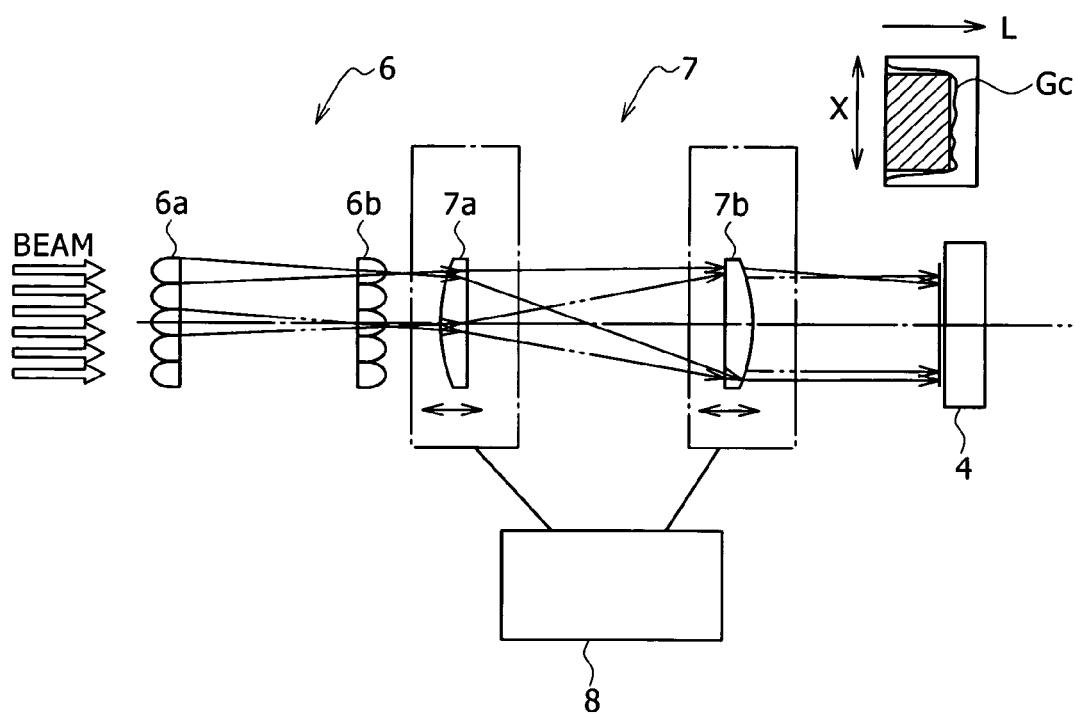
FIGS. 4 to 7 are schematic views showing different forms of the illumination apparatus to which the present invention is applied.

FIG. 4 shows an example wherein the position of a component lens of the relay lens system 7 in the configuration shown in FIGS. 2 and 3 is changed along the optical axis to vary the overlapping state of images obtained by the lens array to uniformize the intensity distribution.

Referring to FIG. 4, the example shown includes a mechanism 8 provided for moving one or both of the lenses 7a and 7b along the optical axis as indicated by double-sided arrow marks in FIG. 4.

The overlapping state of the beams for the illumination light can be changed delicately by adjusting the position of the lenses 7a and 7b to change the arrangement of them. In particular, spatial overlapping positions (positions on an axis parallel to the x axis) of individual images of the lens array or arrays are displaced delicately. Therefore, the profile of the illumination light obtained as a result of the overlap changes, and consequently, the profile of the illumination light can be made smooth over a predetermined range on the x axis by the adjustment based on the detection information by the detection section 4. In other words, in a profile of the illumination light schematically shown at a right upper portion in FIG. 4 (the x axis and the L axis are such as described hereinabove with reference to FIG. 2), the uniformity of the illumination light is enhanced as seen from a graph line Gc.

It is to be noted that, although the adjustment described above may be performed manually while a result of measurement of the intensity distribution obtained by the detection section 4 is referred to, preferably the adjustment is performed automatically taking the workability, convenience and so forth into consideration. For example, while the mechanism 8 is operated by a driving source such as a motor, measurement of the intensity distribution is performed and an adjustment process is performed so that the dispersion of the light intensity distribution may be minimized or may fall within a predetermined allowable range. Further, although such an adjustment operation as described above can be performed suitably, since the necessity to perform the adjustment operation frequently is low, for example, such a time counting unit as an interval timer may be used to perform the adjustment operation periodically after every fixed interval of time. Or, the adjustment operation may be performed as occasion demands at a stage of preparation (for example, before projection of an image) before the apparatus is used.

The arrangement shown in FIG. 4 does not require an optical element for exclusive use for the adjustment because only adjustment in position of the existing lenses 7a and 7b is involved.

Figure 5:
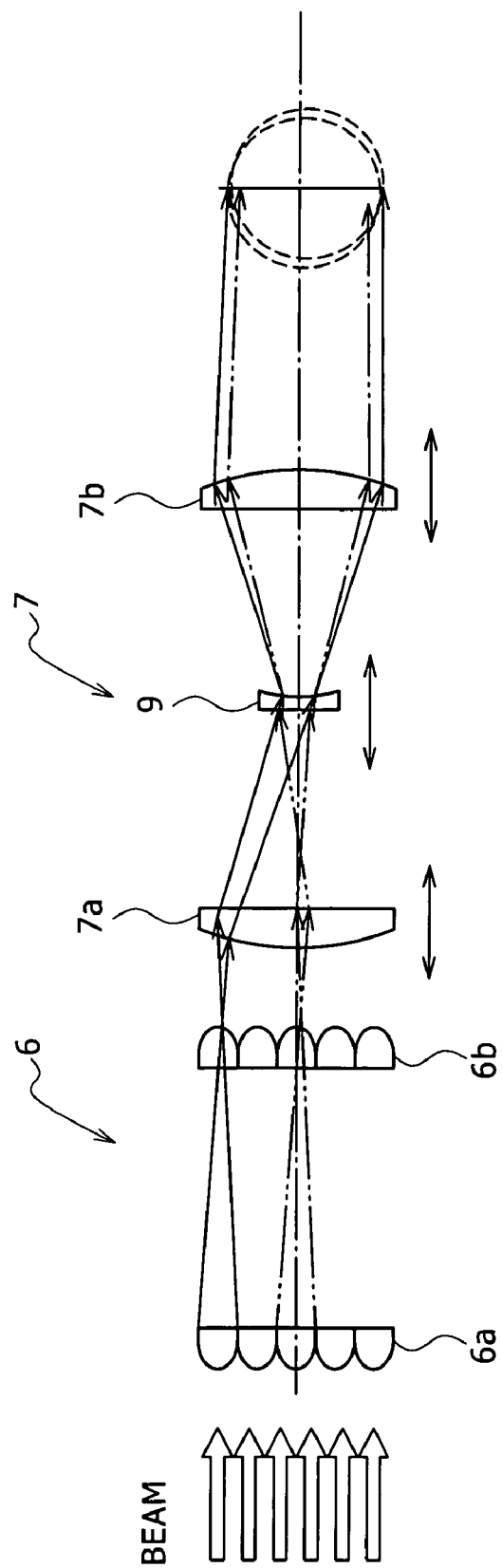

As another form of the form (I) described hereinabove, for example, the position of a negative lens for beam divergence disposed in the relay lens system 7 may be adjusted as seen in FIG. 5.

Referring to FIG. 5, where a lens 9 disposed between the lenses 7a and 7b and a mechanism for moving the lens 9 along the optical axis are provided and the position of the lens 9 is adjusted by means of the adjustment section 5, such an advantage that the amount of adjustment (amount of displacement of the lens) may be small is achieved. In this instance, various forms are available including a form wherein the lens 9 is moved together with the lens 7a and/or the lens 7b.

Now, the form (II) mentioned hereinabove is described.

In order to vary the incident position of laser beams to the optical system 3 by means of the adjustment section 5, a mechanism for adjusting the positions of the laser light sources individually may be provided.

Figure 6:
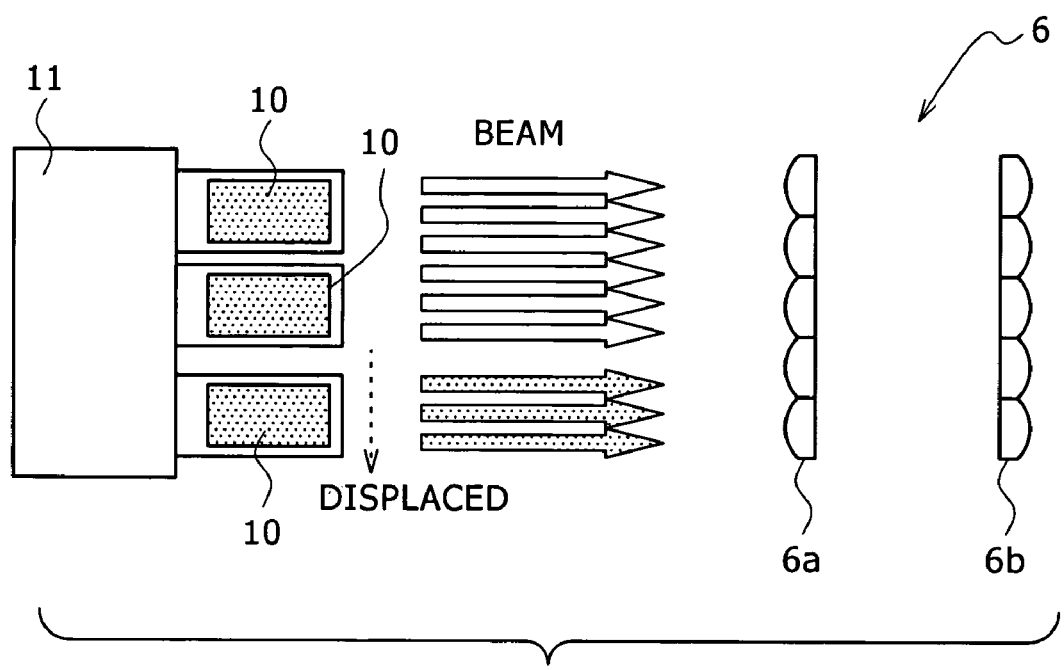

For example, as seen in FIG. 6, a mechanism 11 for adjusting the positions of laser light sources 10 individually in a predetermined direction (in an upward and downward direction) is provided. When some non-uniformity of the illumination light is detected from detection information obtained by the detection section 4, a laser light source 10 is displaced as indicated by a broken line arrow mark in FIG. 6 to restore the uniformity of the illumination light. In other words, the incident position of some of the laser beams of the beam array incident to the optical system 3 is displaced to change the incident profile to the lens element of the lens array 6a corresponding to the displaced beam. The loss by displacement upon overlapping of the profiles is eliminated thereby, and besides since the laser light sources can be adjusted individually, the degree of freedom in profile adjustment can be enhanced.

It is to be noted that, although only the front group of the optical system 3 is shown in FIG. 6 for the convenience of illustration, naturally the optical system 3 can be applied to the configurations shown in FIGS. 4 and 5.

In place of the positional adjustment of the laser light sources, for example, it is possible to dispose an optical element for repeating such as a reflecting mirror or a lens between each of the laser light sources and the optical system 3. In particular, when non-uniformity of illumination light is detected from detection information by the detection section 4, the repeating reflecting mirrors may be adjusted individually in angle or the lens positions may be adjusted individually.

In the form (III), the position or the posture of an optical element disposed between the light source section and the optical system is changed by the adjustment section 5.

Figure 7:
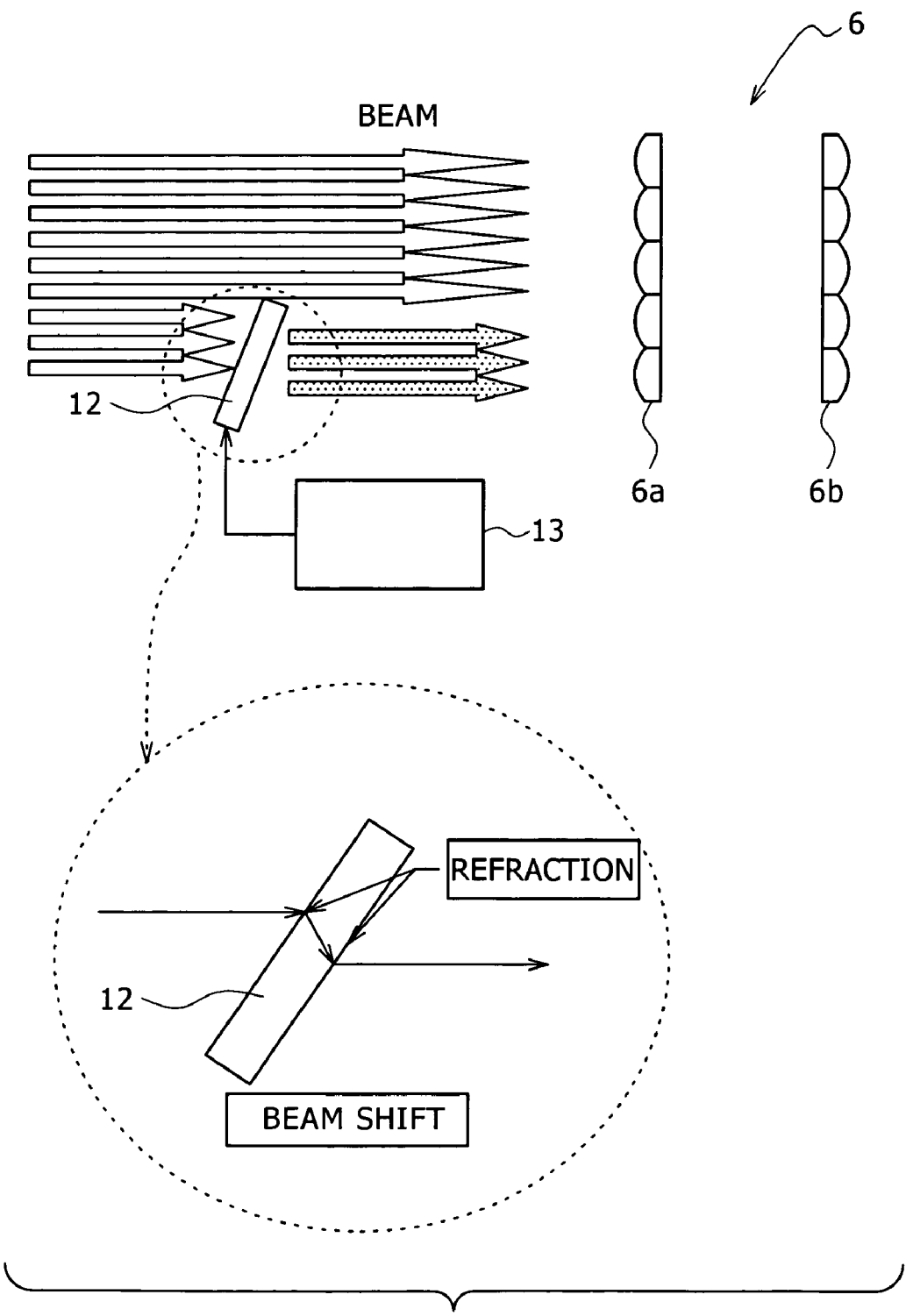

For example, such a glass parallel flat plate as shown in FIG. 7 is inserted as an optical element 12 and a mechanism 13 for adjusting the angle of the optical element 12 with respect to the optical axis is provided. Consequently, as illustrated in an enlarged scale in a large circle in FIG. 7, light is diffracted by interfaces provided by an incident surface and an emergent surface of the parallel flat plate thereby to cause a beam shift. In other words, since the incident position of a beam can be shifted by adjusting the angle of the parallel flat plate, a similar effect to that described above can be achieved by a configuration similar to that which changes the position of a laser light source. It is to be noted that it is possible to use a diffraction element or the like in place of the parallel flat plate. Further, although only the front group of the optical system 3 is shown in FIG. 7, naturally the optical element 12 can be applied to the configurations shown in FIGS. 4 and 5.

Although each of the forms (I) to (III) described above can be adopted independently, such a combination form as the form (IV) described above is possible. However, it is preferable to adopt an adjustment mechanism which is stable against a secular change rather than to complicate a mechanism uselessly.

Where the configuration described above is adopted, for example, the following advances can be achieved.

According to the form (I), the profile of illumination light can be changed by some change of the lens arrangement and non-uniformity of illumination light arising from a secular change or the like can be moderated.

According to the form (II), the profile of illumination light can be changed by moving the incident beam positions relative to the optical system. Further, since individual profiles before overlapping can be changed without any limitation to the change thereof, the degree of freedom in adjustment can be enhanced.

Where the form (III) is used, mechanical simplification can be anticipated.

Now, the form (B) is described.

In this form, since the output of each of the laser light sources which form the light source section 2 is changed individually by the adjustment section 5, for example, based on characteristic data of the laser stored in advance, it is possible to uniformize the illumination light profile without the necessity for position adjustment and so forth of the optical elements.

In a configuration form which uses a plurality of laser light sources, it is difficult to achieve complete uniformization of the illumination light profile due to a power variation by individual differences of the lasers and a secular change of the individual lasers or a dispersion in tolerance in manufacture and so forth. Therefore, it is a possible idea to adopt a controlling method of making use of a modulation function which a display device of an object of illumination has to adjust the gradation range in accordance with a dropping degree of the light intensity on the profile. This is a method which does not use the full gradation range with regard to each of the pixels of the display device but adjusts the gradation range of each pixel in response to the light intensity distribution. This method is implemented by driving control of the device.

However, such control as just described has a problem that, where it is intended to achieve uniformization of transmission light or reflection light from a display device, the number of gradations used to display an image decreases, resulting in decrease of the dynamic range. In particular, the gradation range which can be utilized to display an image decreases by an amount of the gradation range necessary for uniformization of a profile.

Therefore, in order to implement a function of moderating the non-uniformity of the illumination light profile by controlling the power of individual lasers in an optical system which uses a laser light source (for example, an arrayed light source such as a laser array bar) to uniformly illuminate a display device for an image, for example, one of the following forms are adopted:

(1) A form wherein the outputs of individual lasers are controlled based on data of a characteristic curve representative of a relationship between the driving current and the power regarding each of the lasers;

(2) A form wherein a profile waveform of each laser and the output of the laser is controlled based on the detection data to uniformize the profile; and (3) A form wherein, in a configuration wherein transmission light or reflection light from a display device is outputted to a projection optical system, a profile detection apparatus is installed at a stage next to the projection optical system to perform output control of the individual lasers thereby to control the profile shape taking also the ambient light amount ratio of the projection optical system into consideration.

From the foregoing, the non-uniformity of illumination caused by individual differences of the individual lasers, a dispersion in tolerance of manufacture and so forth can be corrected.

Figure 8:
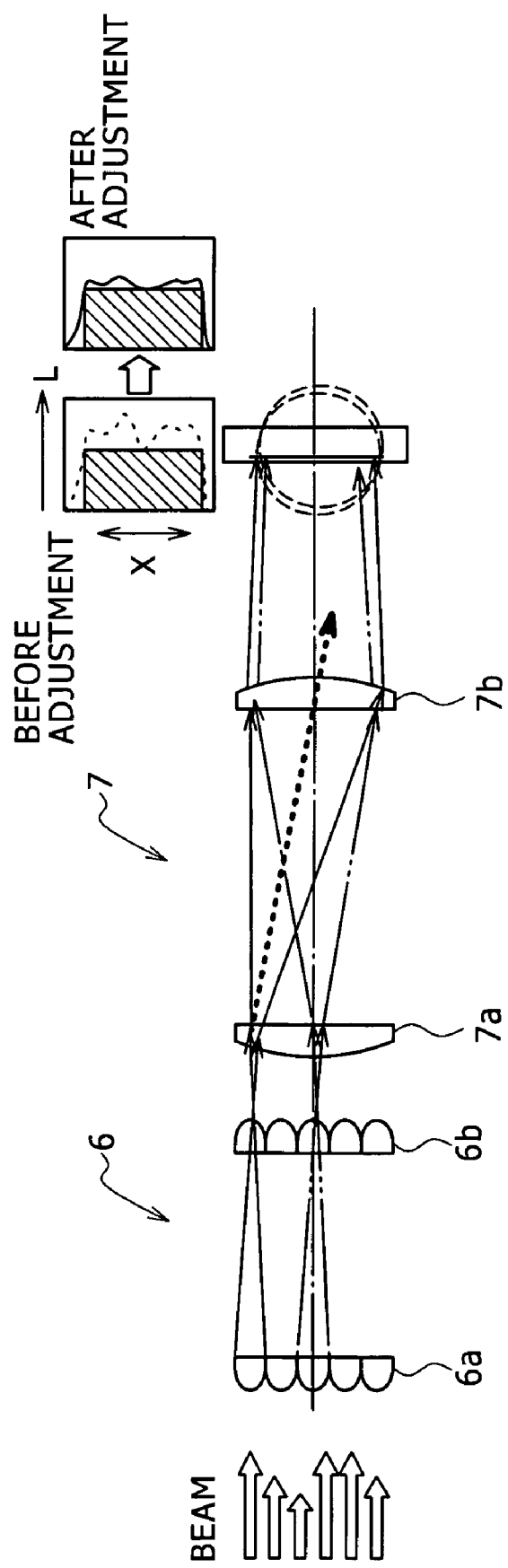
FIG. 8 is a schematic view illustrating optical output control according to the present invention.

FIG. 8 illustrates the form (1) above. Referring to FIG. 8, the form (1) shown includes an optical system having a basic configuration same as that of FIG. 2.

When laser beams are inputted from the left side in FIG. 8, images of the lens array on the incidence side overlap with each other on the focal plane and illuminated upon the illumination object element. However, if the individual profiles are changed by deterioration of the installation accuracy, a secular change, a drop of the luminance and so forth of the incident beams, then the uniformity of the illumination light may be deteriorated. Therefore, if the illumination light profile on the display device is detected and the individual laser powers are controlled so that they are adjusted to a minimum value on the intensity distribution, then in an illumination light profile schematically shown at a right upper portion in FIG. 8 (the x axis and the L axis are such as described hereinabove with reference to FIG. 2), an intensity distribution having a high degree of uniformity (indicated by a solid line) is obtained from an intensity distribution before the adjustment (refer to a broken line).

Figure 9:
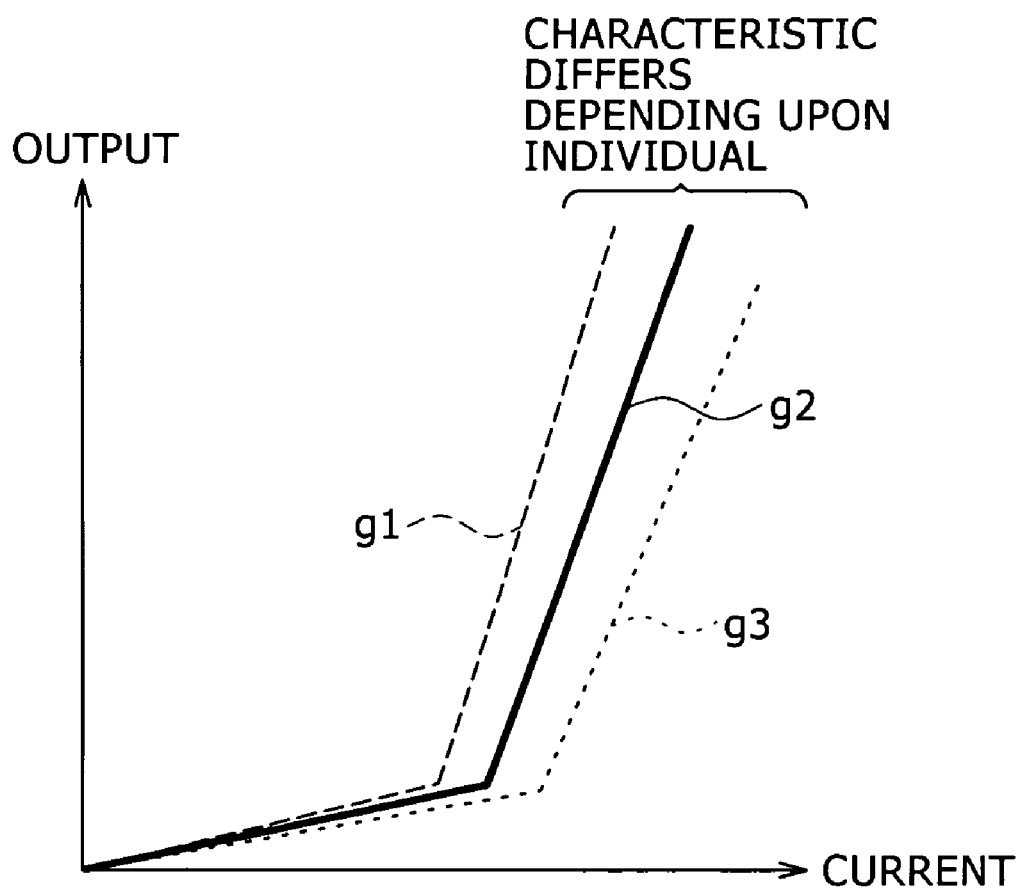
FIG. 9 is a diagram illustrating a dispersion in laser characteristic among different lasers.
Figure 10:
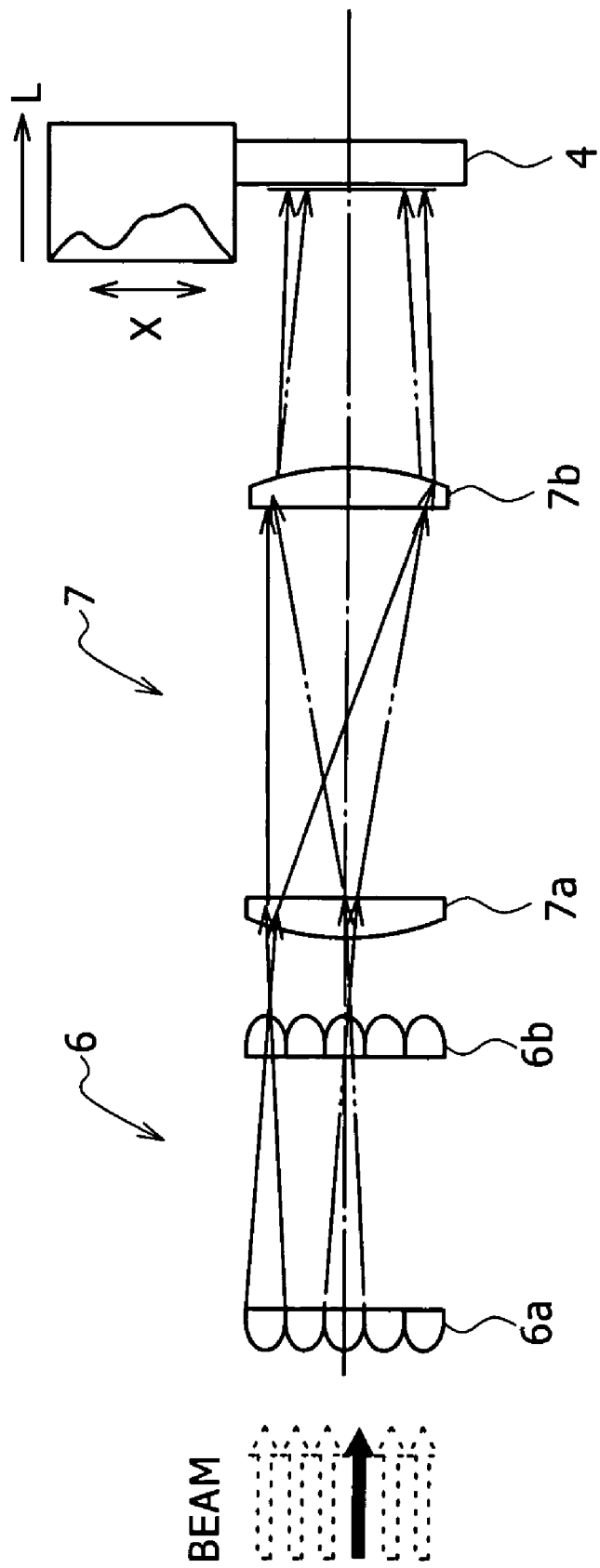
FIG. 10 is a schematic view illustrating profile measurement of a certain laser light source used in the optical output control according to the present invention.

When the laser powers are controlled, it is necessary to take dispersions in characteristic of the individual lasers into consideration as seen from FIG. 9. In FIG. 9, the axis of abscissa is current (driving current) and the axis of ordinate is the laser output power, and characteristics of individual lasers are illustrated by graph lines g1, g2 and g3.

Data of the individual laser characteristics in regard to differences of the value of threshold current, a rate of change of the optical output power with respect to a variation of current and so forth are investigated in advance, and the data are stored into a storage device such as a nonvolatile memory. Then, when actual profile adjustment is to be performed, preferably the data is read out to vary the driving current for the individual lasers to accurately control the laser powers.

In the form (2) described above, when a countermeasure against a secular change and so forth of the laser characteristics is taken into consideration, the individual lasers are driven one by one to detect the light intensity distribution when the power is varied, and profile data of the individual lasers are recorded. Then, in order to achieve uniformization of the profiles, the driving current for the individual lasers is varied based on the recorded data to control the powers of the individual lasers.

Figure 11:
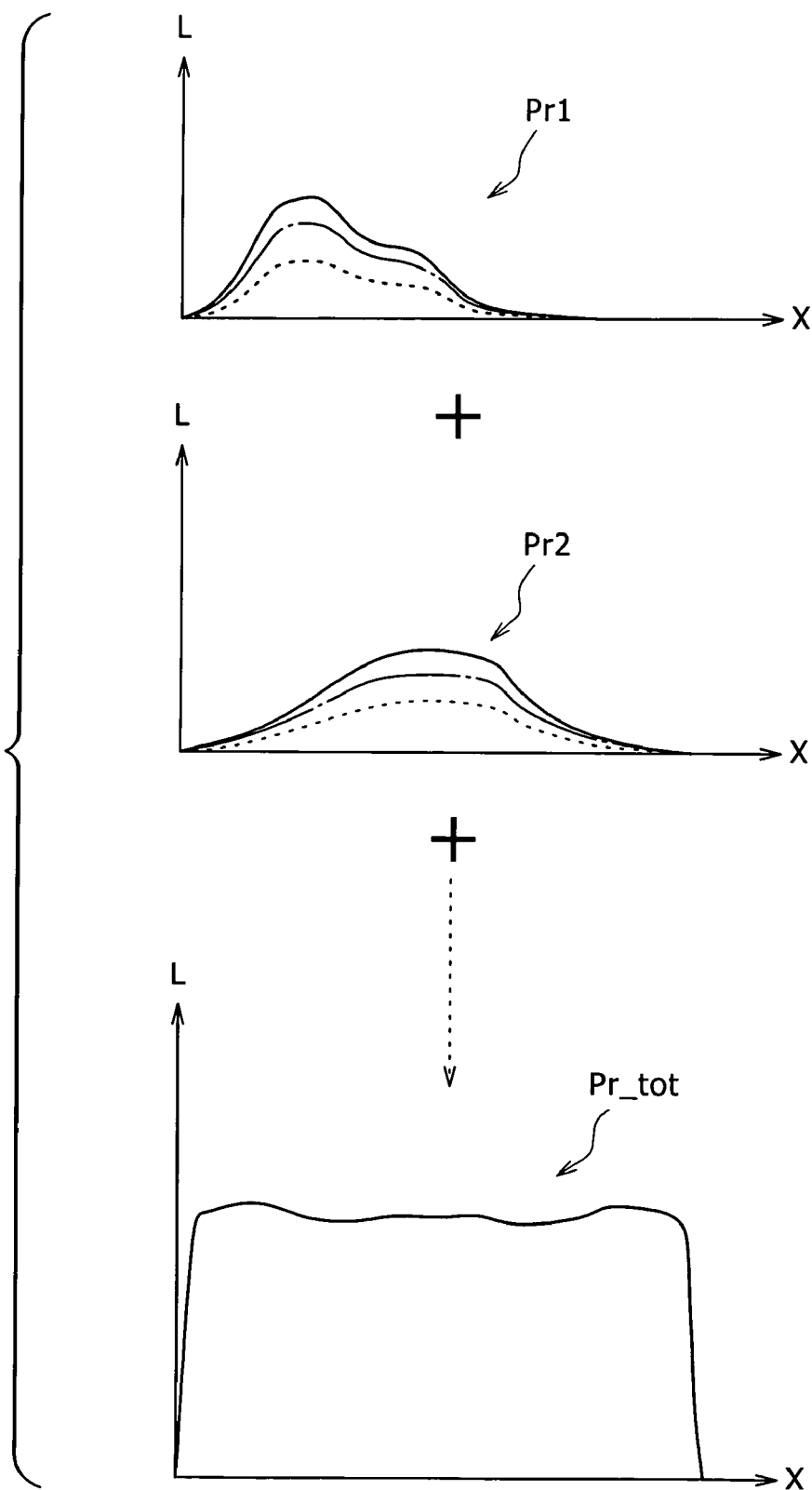
FIG. 11 is a schematic diagrammatic view illustrating profiles of different laser light sources and an entire profile of the laser light sources.

FIG. 11 is a schematic diagrammatic view illustrating profiles Pr1, Pr2, ... of the individual laser light sources and an entire profile Pr_tot formed from the profiles Pr1, Pr2, . . . overlapped with each other on the focal plane by the optical system.

Such a process as described below is taken for the profile adjustment:

(a) A particular laser light source is driven to emit light;
(b) Profile data when the laser power is successively changed are acquired and stored into a memory or the like;
(c) The steps (a) and (b) are repeated for another laser light source;
(d) All of the laser light sources are driven to operate with a maximum power to perform intensity measurement for a composite profile;
(e) While a composite profile which is obtained when an individual one of the laser light sources is varied is measured, the power of each laser light source is controlled individually; and
(f) The step (e) is repeated until after the uniformity of the composite profile becomes within an allowable range.

For example, such a particular determination method for the power distribution is used:

1) It is recoded to what position of the profile each laser contributes when it is driven to emit light by itself;
2) The output power of the laser which contributes to a bottom portion of the profile is raised based on a current to output power conversion value;
3) The output power of the laser which contributes to a top portion of the profile is lowered based on a current to output power conversion value; and
4) The steps 2) and 3) are repeated until after the width of the "maximum value–minimum value" of the profile falls within a fixed range.

The output power of each laser is successively determined in accordance with the process described above.

It is to be noted that, in order to decide the uniformity, a method may be used wherein it is used as a criterion that, for example, within the length of an effective range of the profile (required length for the illumination light), a maximum value and a minimum value fall within a range determined in advance.

Figure 12:
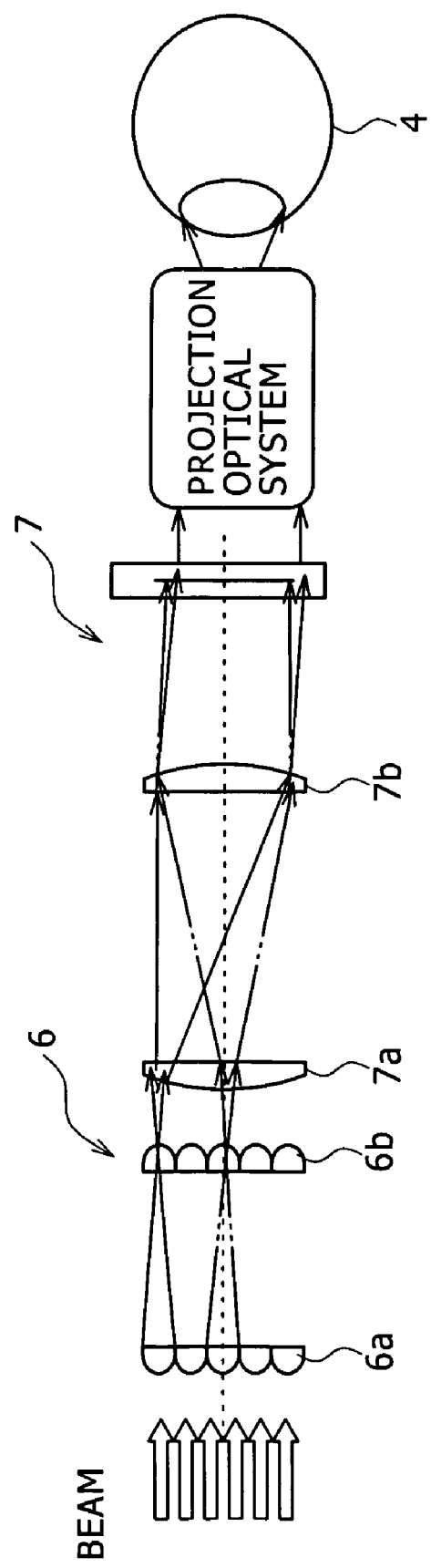
FIG. 12 is a schematic view showing an example of a configuration wherein a profile detection section is disposed at the following stage of a projection optical system.

Meanwhile, in the form (3) mentioned hereinabove, in a system configuration wherein the profile detection section 4 is disposed at a next stage to the projection optical system (including a projection lens) as seen in FIG. 12, the laser powers are controlled individually based on measurement data of the profile by the detection section 4. The projection optical system includes a one-dimensional projection system, a two-dimensional projection system including a light scanning mechanism, and so forth. Further, the detection section 4 may have a form which uses, for example, a condenser lens, an integrating sphere, a photo detector or the like.

Figure 13:
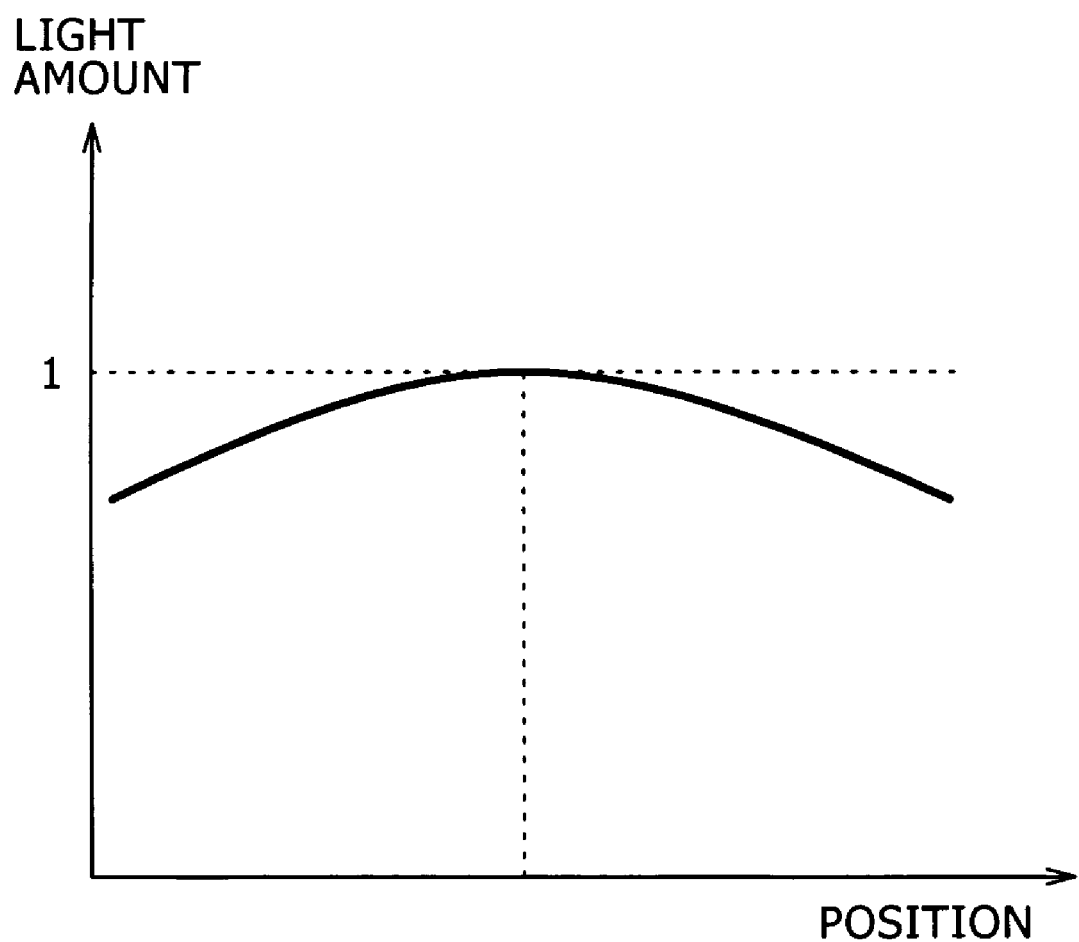
FIG. 13 is a graph illustrating a drop of an ambient light amount of a lens system.

FIG. 13 illustrates a characteristic of a projection lens. In FIG. 13, the axis of abscissa indicates the position coordinate (relative value) with reference to the optical axis of the lens, and the axis of ordinate indicates the light amount (relative ratio) with reference to the center of the lens.

As seen from FIG. 13, as regards light having passed through the projection lens, it is necessary to take a drop of the ambient light amount into consideration.

Therefore, when a system for detecting a profile of output light having passed through a projection optical system is to be constructed, profile correction including an ambient light amount ratio of the projection optical system can be performed by controlling the laser powers in response to detection data of the profile.

The illumination light profile control method according to the present invention described above can summarized in the following manner that:

where a plurality of laser beams are obtained from a light source section including a laser light source and are outputted through an optical system, detection information of the light intensity distribution on a focal plane is acquired; and that the light intensity distribution on the focal plane is varied by adjustment of the optical system or adjustment of the output power of the laser light source based on the detection information to enhance the uniformity of the illumination light profile.

Now, an image display apparatus to which the present invention is applied is described.

Figure 14:
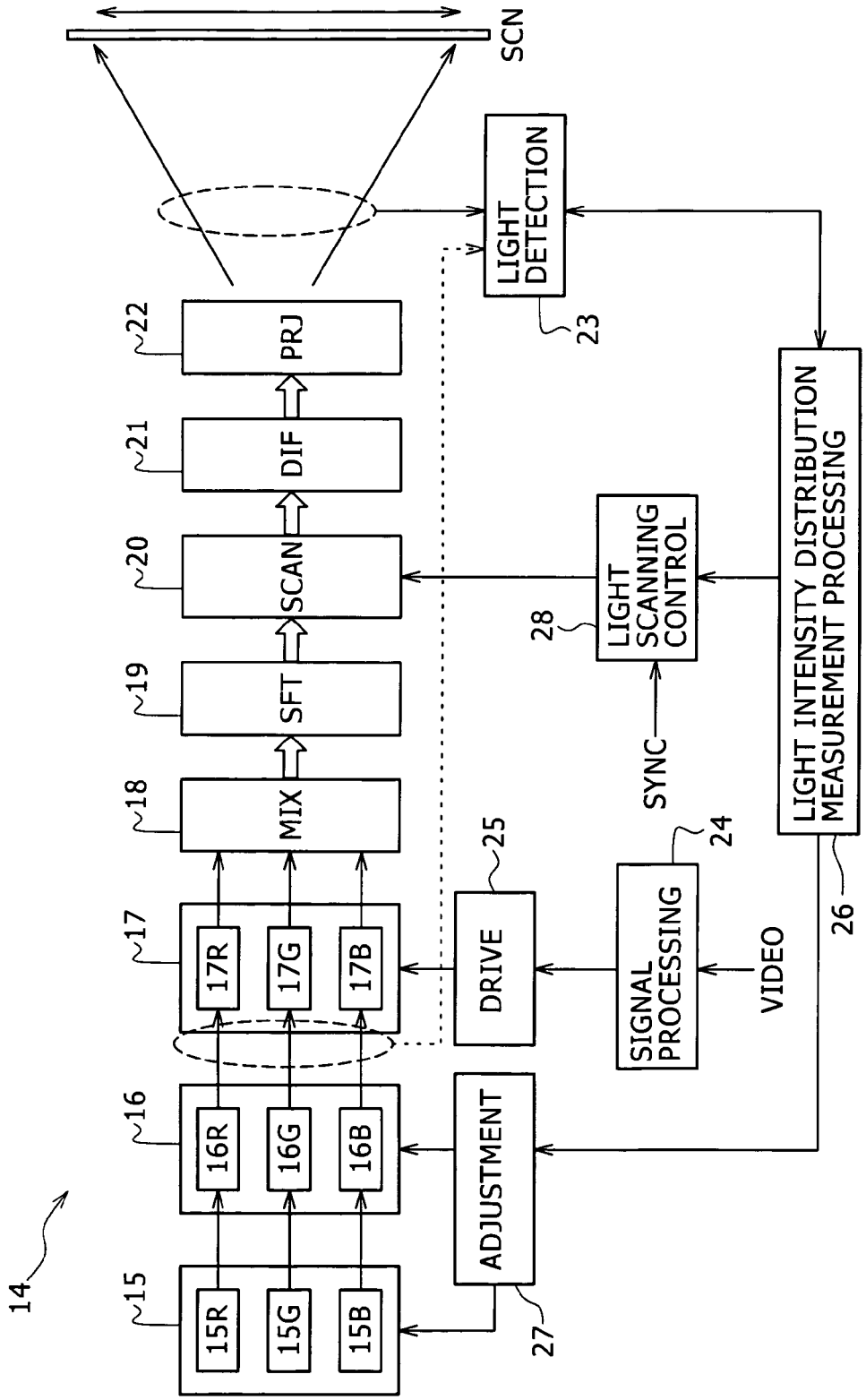
FIG. 14 is a block diagram showing a general configuration of an image display apparatus to which the present invention is applied.

FIG. 14 shows a general configuration of an image display apparatus of the front projection type to which the present invention is applied.

Referring to FIG. 14, the image display apparatus 14 shown includes a light source section 15. Emergent light from the light source section 15 passes through an illumination optical system 16 and comes to an optical modulation section 17, by which it is modulated. The modulated light successively passes through a color combination section 18 and a spatial filter 19 and comes to a light scanning section 20. Then, the light is projected to a screen SCN through a light diffusion section 21 and a projection optical system 22 to display an image on the screen SCN.

The light source section 15 includes laser light sources 15R, 15G and 15B for red (R) light, green (G) light and blue (B) light for each of which a semiconductor laser, a solid-state laser or the like may be used. The laser light sources 15R, 15G and 15B receive power supply from a power supply section not shown and output laser beams of wavelengths corresponding to the colors therefrom.

The illumination optical system 16 converts the beams outputted from the laser light sources 15R, 15G and 15B into one-dimensional linear beams and is formed using, for example, a beam expanding optical system, a line generator or the like. The illumination optical system 16 includes optical systems 16R, 16G and 16B for R, G and B, respectively.

The optical modulation section 17 includes one-dimensional optical modulation elements 17R, 17G and 17B corresponding to the colors of R, G and B and receive the linear beams of illumination light profiles uniformized by the optical systems 16R, 16G and 16B, respectively.

In an application wherein a GLV device is used as a one-dimensional optical modulation element, in the case of a reflection type diffraction grating, a plurality of movable ribbons and a plurality of fixed ribbons are disposed alternately along a predetermined direction. For example, where one pixel is formed from six ribbon elements such that three movable ribbons and three fixed ribbons are disposed alternately, for 1080 pixels for one line, 6480 ribbon elements are arrayed in a one-dimensional direction (major axis direction). First faces, which are the surface of the movable ribbons, and second faces, which are the surface of the fixed ribbons, are disposed alternately on an illumination plane of the laser beams, and when a movable ribbon receives a driving signal from a driving section 25 hereinafter described, it is moved so that the first face thereof is controlled in position in the direction along the illumination direction of the laser light. In short, if a driving voltage is applied to a movable ribbon in response to an image signal, then the movable ribbon moves by a displacement amount corresponding to the driving voltage value, and a reflection type diffraction grating for the incident light is formed in this state of the movable ribbon (pixel-on state) (generation of first-order diffraction light). On the other hand, in a state wherein a movable ribbon is not moved and has no displacement amount with respect to a fixed ribbon (pixel-off state), no first-order diffraction light is generated (only regular reflection of the incident light occurs). It is to be noted that, where a GLV device is used, such advantages are achieved that high speed operation control is possible, that an image of a high resolution over a wide bandwidth can be displayed with a low operation voltage, and so forth.

Reflection light and/or diffraction light of the illumination light illuminated on a one-dimensional optical modulation element are generated in this manner. Thus, the color combination section 18 combines the modulated color lights, and the resulting composite light is sent to the spatial filter 19.

The spatial filter 19 has a role of selecting a diffraction light component of a particular order and is formed, in the present example, from a schlieren filter in order to extract ±first-order diffraction light from within light modulated using a one-dimensional optical modulation element. In other words, the 0th order light which is not used for image display is intercepted.

The light scanning section 20 at the next stage is formed, for example, from a galvanometer and receives incident light of a one-dimensional image to form a two-dimensional intermediate image. In particular, where the formation direction of a one-dimensional image is determined as "first direction", this direction corresponds to the major axis direction of the one-dimensional optical modulation eminent, and a two-dimensional intermediate image is formed by optical scanning along a "second direction" perpendicular to the first direction. It is to be noted that a unidirectional scanning method or a bidirectional scanning method may be used for the scanning. In the former scanning method, for example, the left end edge of the display screen is determined as a scanning start position while the right end edge of the display screen is determined as a scanning end position. Thus, after a vertical line extending in the first direction is scanned along the second direction after light scanning is started from the left end edge of the display screen until the right end edge is reached, the vertical line returns to the left end edge and the light scanning is repeated. On the other hand, in the latter scanning method, that is, in the bidirectional scanning method, each of the left end edge and the right end edge of the display screen is used as both of a scanning start position and a scanning end position. Thus, for example, light scanning is started from the left end edge, and after the right end edge is reached after a vertical line extending in the first direction is scanned along the second direction, the light scanning is performed in the opposite direction now from the right end edge. Thereafter, after the original left end edge is reached, the light scanning is started from the left end edge again. Such a series of operations as just described is repeated.

A two-dimensional intermediate image obtained by such optical scanning as described above passes through the light diffusion section 21 and is projected on the screen SCN by the projection optical system 22 to display an image on the screen SCN.

It is to be noted that a diffuser is used for the light diffusion section 21 to obtain diffused light in order to reduce speckles (noise) and so forth, and the projection optical system 22 is a two-dimensional projection optical system including a projection lens.

A light detection apparatus 23 is provided for the projection optical system 22 and receives light emitted from the projection optical system to detect the light intensity of the received light. Details of the light detection apparatus 23 are hereinafter described in detail.

Now, an image processing system and a control system are described.

A video signal denoted by "VIDEO" in FIG. 14 is signaled to the driving section 25 through a signal processing section 24.

The signal processing section 24 converts the video signal from color difference signals into RGB color signals. If the RGB signals have a nonlinear characteristic such as a γ (gamma) characteristic applied thereto, reverse correction is performed to convert the nonlinear characteristic into a linear characteristic. Further, the signal processing section 24 performs a color space conversion process for making the RGB signals compatible with the color reproduction range of the illumination light source.

The driving section 25 is provided to drive the one-dimensional modulation elements and includes an element driving circuit. Thus, the driving section 25 produces driving signals corresponding to the signal from the signal processing section 24 and supplies the driving signals to the one-dimensional optical modulation elements of the optical modulation section 17. In other words, the driving section 25 controls driving of the optical modulation elements of the optical modulation section 17 to modulate the laser lights of the individual colors.

A light intensity distribution measurement processing section 26 is provided to process detection information from the light detection apparatus 23 to measure a light intensity distribution and cooperates with the light detection apparatus 23 to form a light intensity distribution measurement section.

An adjustment section 27 is provided to perform optical adjustment relating to the light source section 15 and/or the illumination optical system 16 or perform output power adjustment of the laser light sources, which form the light source section 15, in accordance with an instruction from the light intensity distribution measurement processing section 26. The adjustment section 27 corresponds to the adjustment section 5. In particular, the adjustment section 27 corrects the light intensity distribution against a secular change or the like at a suitable timing so that uniform illumination light may be obtained on the illuminated faces of the first-order optical modulation elements. It is to be noted that the adjustment section 27 includes, for example, a mechanism for adjusting the position or the posture of an optical element by means of a moving mechanism including a motor as a driving source or an actuator or a mechanism for adjusting the posture of an optical element using a pivoting mechanism or the like. Further, the adjustment section 27 includes a mechanism for adjusting the incident positions, incoming directions and so forth of the laser beams to the optical systems 16R, 16G and 16B or a control section for controlling the output power of the laser light.

A light scanning control section 28 cooperates with the light scanning section 20 to form a light scanning section and performs control for scanning a one-dimensional image obtained by modulation of light using the one-dimensional optical modulation elements. In particular, the light scanning control section 28 signals a control signal to the light scanning section 20 in accordance with a synchronizing signal denoted by "SYNC" in FIG. 14 and an instruction (optical scanning position instruction signal) from the light intensity distribution measurement processing section 26 to control operation of the light scanning section 20 (rotation of the galvano mirror).

It is to be noted that, while the example shown in FIG. 14 adopts a configuration wherein the projection optical system 22 is disposed next to the light scanning section, the disposition of the projection optical system 22 and the optical scanning section is not limited to this, but alternatively the optical scanning section may be disposed next to the projection optical system.

The following forms may be used as a form where an image for measurement of the light intensity is displayed to perform measurement of the light intensity distribution:

at a stage wherein calibration, initialization or the like is performed as a preparation stage for image projection, an image for measurement is outputted from the projection optical system 22 so that the light detection apparatus 23 detects the light intensity; and while image projection is proceeding, an image for measurement is outputted from the projection optical system 22 such that no bad influence is had on the image display so that the light detection apparatus 23 detects the light intensity.

Figure 15:
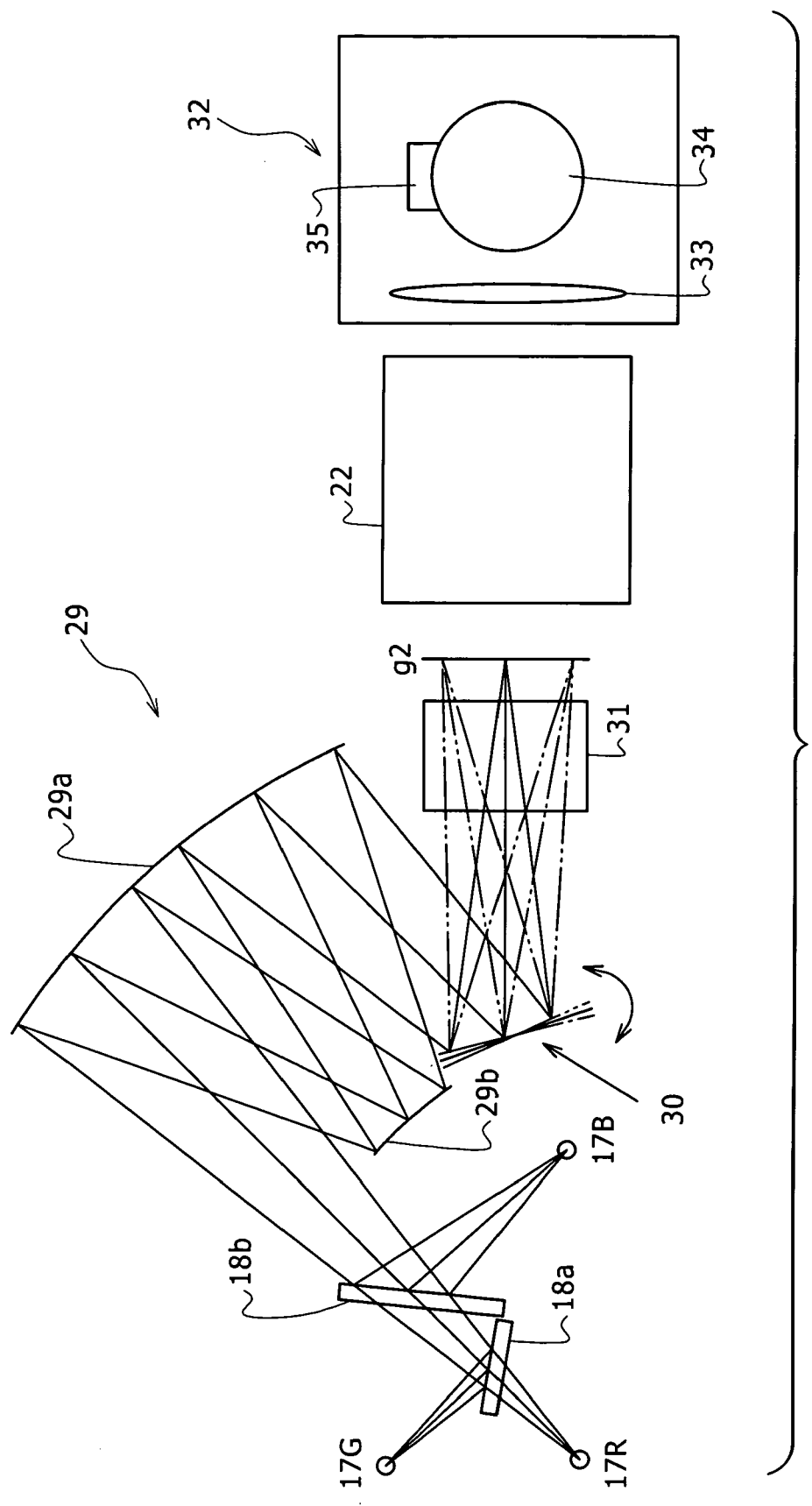
FIG. 15 is a schematic diagrammatic view showing an example of a configuration of an optical system after optical modulation in the image display apparatus of FIG. 14.

FIG. 15 illustrates part of the optical system of the image display apparatus 14.

Lights from the illumination light source are illuminated individually on the one-dimensional optical modulation elements 17R, 17G and 17B corresponding to the colors of R, G and B, respectively, through individual optical systems. It is to be noted that lasers for illuminating individual color laser beams are used individually for the light sources, and the laser beams are illuminated on the one-dimensional optical modulation elements 17R, 17G and 17B after they are individually shaped into linear beams by line generators or like elements.

The laser beams are modulated by the one-dimensional optical modulation elements 17R, 17G and 17B and then optically combined by color combining mirrors 18a and 18b, and the resulting composite light reaches a galvano scanner 30 through an Offner relay system 29 and is optically scanned by the galvano scanner 30.

The Offner relay system 29 is formed from a main mirror (concave mirror) 29a and a sub mirror (convex mirror) 29b. Thus, the composite light is first reflected by the main mirror 29a, reflected by the sub mirror 29b, and then reflected by the main mirror 29a again, whereafter it is emitted toward the galvano scanner 30. If the sub mirror 29b is provided with a function of a schlieren filter (function of separating regular reflection light components and diffraction light components from each other to take out only diffraction light of a particular order) or a schlieren filter is provided additionally for the sub mirror 29b, then it is possible to separate first-order diffraction light and 0th-order diffraction light from each other and selectively pass the first-order diffraction light. For example, the sub mirror 29b may have a schlieren aperture so that unnecessary light components (such as 0th-order light and second-order diffraction light and so forth) may pass therethrough while only ±first-order diffraction light is reflected toward the main mirror 29a. This configuration is simple in optical configuration and suitable for miniaturization and so forth and is effective for reduction of aberrations and so forth.

The formation direction of the one-dimensional image which arrives at the galvano scanner 30 from the Offner relay system 29 is a direction perpendicular to the plane of FIG. 15, and a two-dimensional intermediate image g2 is formed by the optical scanning. In the example shown in FIG. 15, an image surface curvature correction optical system 31 is disposed next to the galvano scanner 30 to remove the curvature of field of the two-dimensional image.

The two-dimensional intermediate image g2 after the correction of the curvature of field is projected in an enlarged scale on the screen by the projection optical system 22. In order to measure the light intensity distribution of the projected image, a measuring instrument 32 is used. The measuring instrument 32 forms the light detection apparatus 23 described hereinabove and is disposed for manual or automatic control in the proximity of an emergent exit of the projection optical system 22. The measuring instrument 32 detects the light intensity of the emergent light from the projection optical system 22 after condensed and averaged.

In the optical system shown in FIG. 15, the measuring instrument 32 includes a condenser lens 33, an integrating sphere 34 and a light detection section 35. The emergent light from the projection optical system 22 is condensed by the condenser lens 33 and introduced into the integrating sphere 34 from an incident port of the integrating sphere 34. The intensity of the light averaged by the integrating sphere 34 is detected by the light detection section 35. It is to be noted that the condenser lens 33 has a function of condensing all of the light emergent from the projection lens to form an image again. Further, in the inside of the integrating sphere 34, the light intensity is uniformized by multiple reflection. Then, an optical sensor which forms the light detection section 35 converts a reception light signal into an electric signal, and the electric signal as a detection signal is used as basic data for the light intensity distribution measurement. In other words, the detection signal is signaled to and processed by the light intensity distribution measurement processing section 26 described hereinabove.

The measuring instrument 32 may be installed in various forms including, for example, a form wherein the measuring instrument 32 is attached to a body section of an image production apparatus and another form wherein a moving mechanism such as a movable stage is used to perform position control of the measuring instrument 32. It is to be noted that, in the latter form, for example, emergent light from the projection optical system 22 can be introduced into the integrating sphere 34 while the measuring instrument 32 is moved in response to the light scanning state of the galvano scanner 30.

In a one-dimensional optical modulation element, measurement by a number corresponding to the number of pixels in the major axis direction thereof is performed. For example, in the case of a GLV device which includes an array of 1080 pixels in a one-dimensional direction, a process of individually turning on (pixel-on state) the pixels one by one beginning with the first pixel and ending with the 1080th pixel and recording the output of the light sensor is performed successively to collect measurement data. Consequently, the light intensity can be measured independently with regard to each pixel.

It is to be noted that it is actually necessary to pay attention to the fact that a characteristic of a one-dimensional optical modulation element, a characteristic of a driving circuit and so forth have a dispersion. In particular, since measurement data obtained using the measuring instrument 32 involve both of an influence of a dispersion in modulation characteristic and an influence of non-uniformity of illumination light arising from a secular change or the like, preferably the influences of them are separated. Since an actual one-dimensional optical modulation element involves a dispersion in characteristic of the element itself arising from the accuracy in production and so forth, a dispersion in characteristic relating to a driving circuit for the element and so forth, a countermeasure can be taken if the modulation characteristic of the element including the influences is measured in advance.

When a profile of illumination light on a one-dimensional optical modulation element before or while an apparatus is actually used, an influence originating from individual differences of the element, a driving circuit and so forth and an production error and so forth can be eliminated. Although description of a particular method is omitted, for example, an apparatus for exclusive use for investigating a modulation characteristic of a one-dimensional optical modulation element is used, and light from laser light sources (reference light sources) of the colors of R, G and B is shaped into a spot-like beam and the spot-like beam is illuminated upon a one-dimensional optical modulation element (GLV element or the like) of an object of measurement. A driving voltage according to a predetermined test signal is applied to one of component elements of the pixels of the one-dimensional optical modulation element which is determined as an object of illumination of the beam spot, and the light modulated by the element is condensed by a lens and detected through a special filter. Thus, data of the modulation characteristic unique to the element can be acquired in a condition that the influence of non-uniformity of illumination light is eliminated.

It is to be noted that, while, in FIG. 14, light detection is performed immediately after the projection optical system 22, in order to prevent an influence of the optical system following the optical modulation section 17, preferably such a form is adopted that profile measurement is performed at a place as near as possible to the illuminated surface of the one-dimensional optical modulation element as indicated by a broken line arrow mark in FIG. 14. However, sufficient attention is required for assurance of the space necessary for disposition of the measuring instrument, the accuracy of measurement and so forth.

Figure 16:
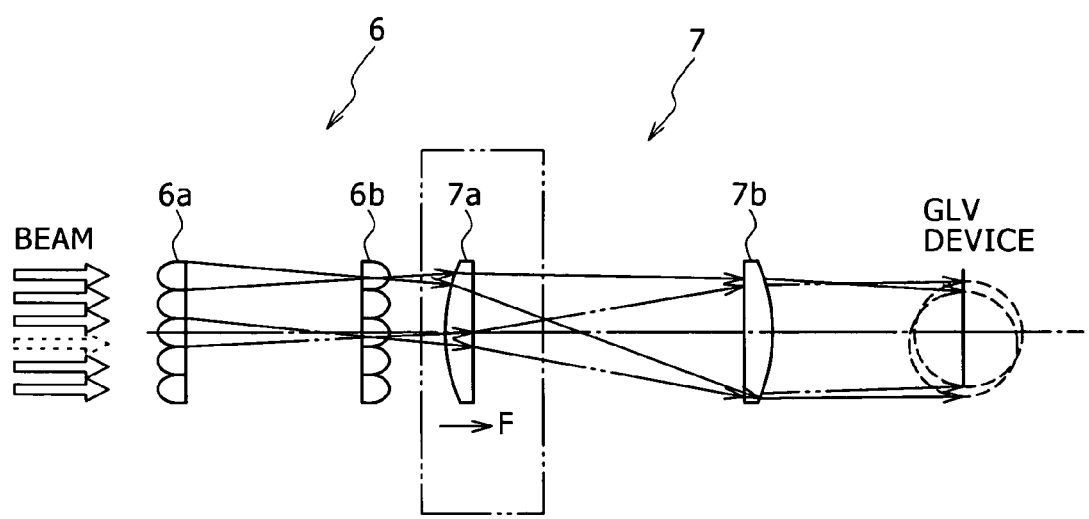
FIG. 16 is a schematic view showing an illumination optical system on a GLV device in the image display apparatus of FIG. 14.

FIG. 16 illustrates a manner wherein six beams from a laser light source of an arbitrary color (for example, the laser light source 15R of FIG. 14) are illuminated on an illuminated portion (GLV element) through an optical system (for example, the optical system 16R of FIG. 14). Referring to FIG. 16, the example shown adopts the form (I) described hereinabove and has a configuration similar to that of FIG. 4. In other words, the laser beams pass through the lens arrays 6a and 6b and the relay lens system 7, whereupon the beam profiles thereof overlap with each other.

Figure 17:
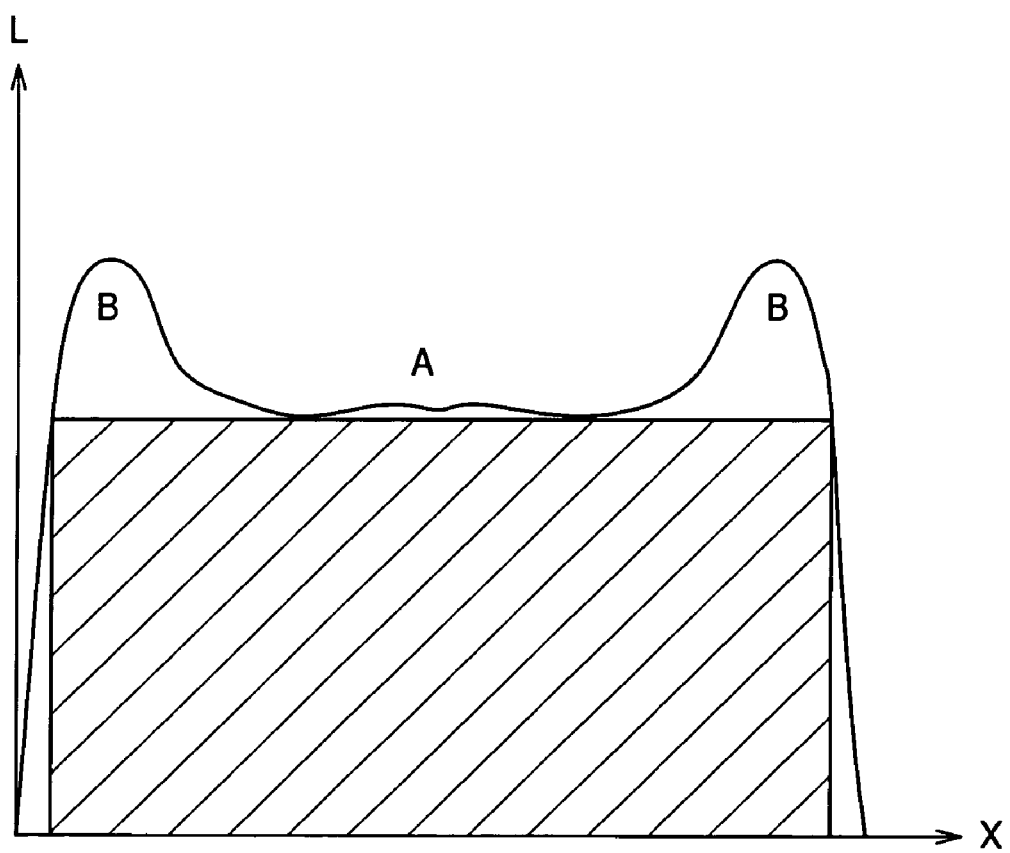
FIG. 17 is a graph schematically illustrating a reference profile of illumination light in the image display apparatus of FIG. 14.

FIG. 17 schematically illustrates a reference profile of illumination light. In FIG. 17, the horizontal axis "x" indicates the coordinate value (corresponding to a pixel position) in the major axis direction of the GLV element, and the vertical axis "L" indicates the light intensity (relative value).

Referring to FIG. 17, a flat intensity portion (refer to an A portion) can be seen over a fixed range, and portions of the reference profile rather near to the opposite ends (refer to B portions) are swollen a little and exhibit a higher intensity. This arises from the fact that it is intentionally increased in anticipation of a drop of the light amount within peripheral regions arising from eclipse in the optical system and so forth. It is to be noted that a portion indicated by slanting lines in a rectangular framework indicates an effectively utilized range.

Figure 18:
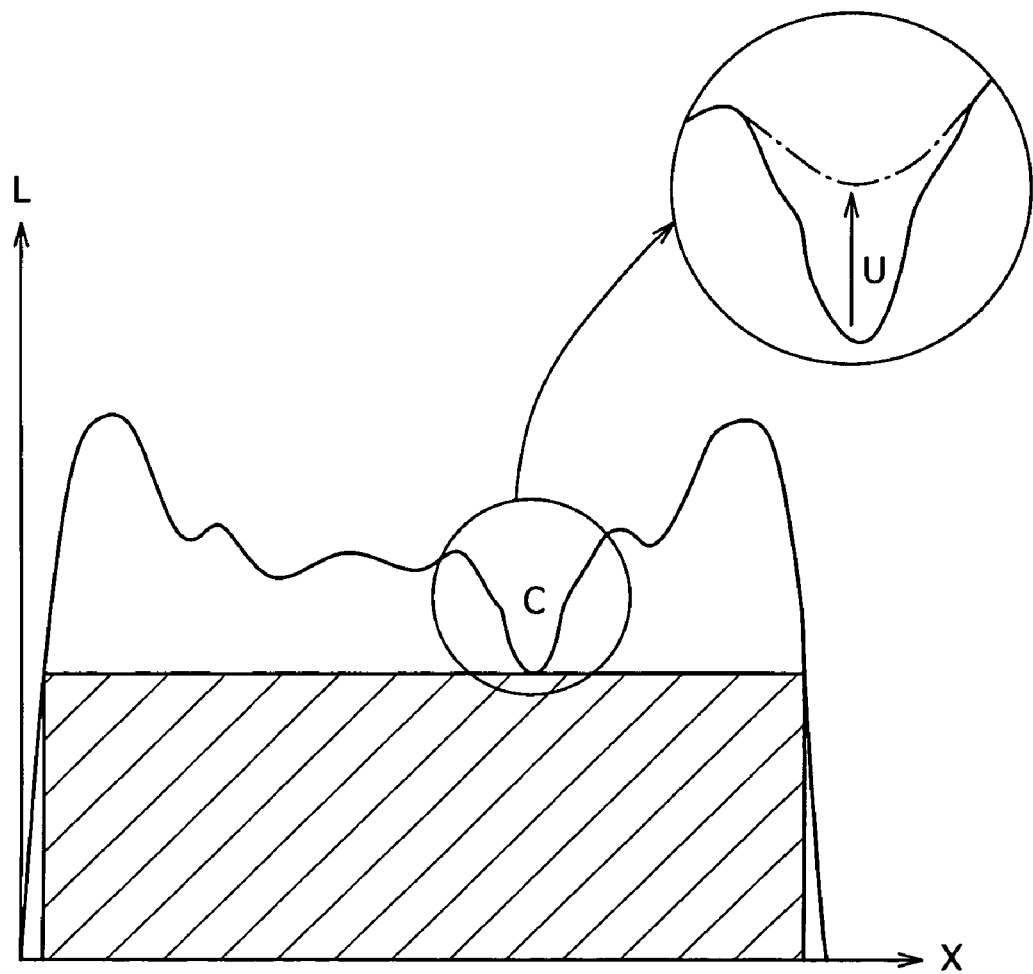
FIG. 18 is a graph illustrating non-uniformity of an illumination light profile and correction of the non-uniformity in the image display apparatus of FIG. 14.

Referring back to FIG. 16, if it is assumed that, for example, a miss (or reduction in intensity) of the third laser beam from below (refer to a broken line) is caused by failure in lighting of the corresponding light source, then the intensity distribution of the illumination light is rendered non-uniform by the miss (or reduction in intensity) as seen in FIG. 18.

In FIG. 18, it can be seen that, as a result of a miss of the laser beam, a great sink in intensity appears at a position (refer to C portion) rather rightwardly of the center of the axis of abscissa as indicated in a circular framework. The sink decreases the intensity within an effectively utilizable range indicated by slanting lines.

In such an instance, it is possible, for example, to move the lens 7a as indicated by an arrow mark "F" in FIG. 16 to reduce the amount of the sink of the light intensity to recover a profile proximate to the reference profile (refer to an arrow mark "U" in FIG. 18).

On the other hand, if a sink portion occurs with an illumination light profile as a result of a drop of the power of a certain laser light source, then according to the method wherein modulation control of a display device such as a one-dimensional optical modulation element is utilized to achieve uniformization, the number of gradations to be used originally for image display on a display device decreases as described hereinabove. In other words, if the number of gradations to be utilized to uniformize the output power increases, then this gives rise to a problem that the number of gradations for original image display becomes insufficient.

Figure 19A:
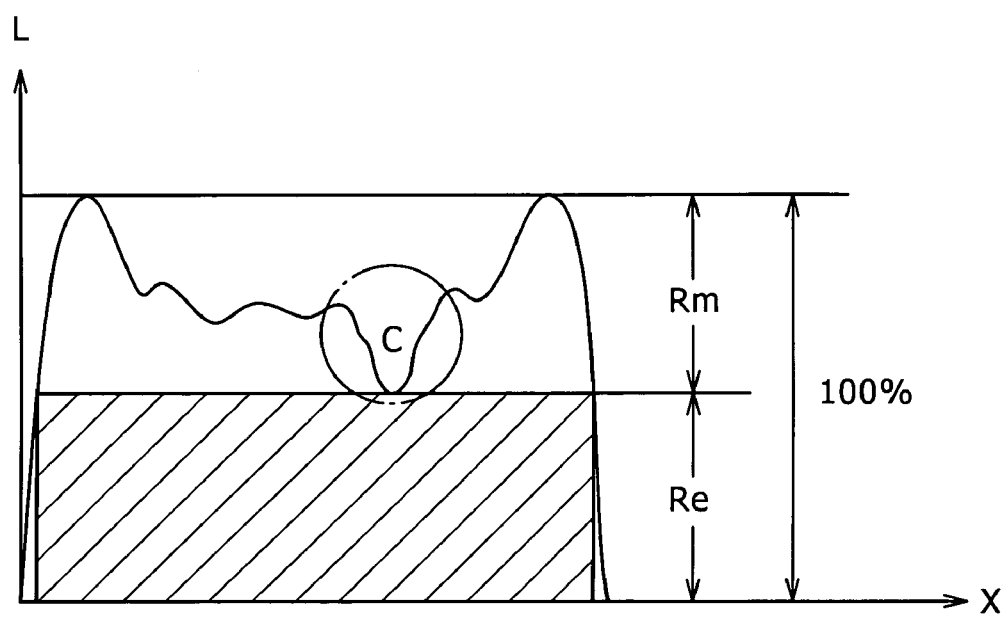
FIGS. 19A and 19B are graphs illustrating power adjustment for maintaining the gradations of a display device in the image display apparatus of FIG. 14.
Figure 19B:
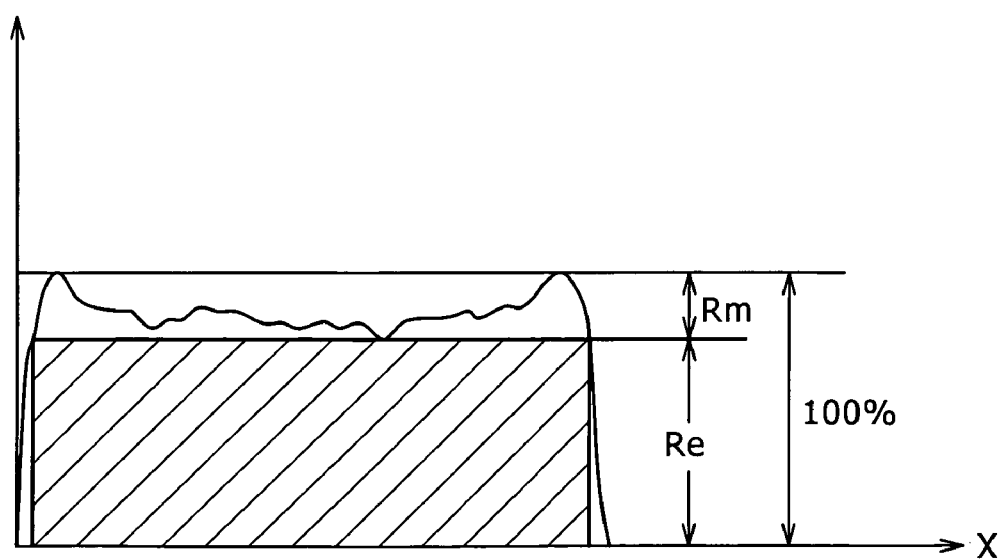

Thus, as illustrated conceptively in FIGS. 19A and 19B, the output power of each of pertaining ones of the laser light sources is decreased so as to be equal to that at a sink portion (refer to a C portion) of an illumination light profile shown in FIG. 19A to uniformize the intensity distribution as seen in FIG. 19B. Consequently, although the entire output power decreases, since the ineffective gradation region (refer to "Rm") decreases, decrease of the effective gradation region (refer to "Re") can be suppressed relatively.

Where the configuration described above is employed, the problem of gradation consumption for profile uniformization of a display device can be eliminated to increase the number of gradations for original image display.

Further, more accurate profile control can be implemented and the uniformity of the illumination light profile can be enhanced by controlling the laser output power based on characteristic data and profile data of individual laser light sources. Consequently, useless gradation consumption by a display device can be suppressed. Particularly where profile data of individual laser light sources are reflected on power control, the powers of the laser light sources can be controlled individually based on data including a tolerance in manufacture and accurate profile control can be carried out.

Further, in a configuration form wherein profile detection is performed at a stage next to a projection optical system, it is possible to achieve uniformization of a final profile taking also the optical characteristic (a drop of the ambient light amount and so forth) of a projection lens and so forth into consideration.

According to the configuration described above, where a plurality of laser beams are used to obtain illumination light of a high degree of uniformity, since a countermeasure against a secular change and so forth can be taken sufficiently, prevention of deterioration of the picture quality and so forth can be achieved efficiently in an application to an apparatus which uses an optical modulation element to modulate light from an optical system to produce an image.

While a preferred embodiment of the present invention has been described using specific terms, such description is for illustrative purposes only, and it is to be understood that changes and variations may be made without departing from the spirit or scope of the following claims.

What is claimed is:

1. An illumination apparatus, comprising:
   a light source section including a laser light source;
   an optical system into which a plurality of laser beams are introduced from said light source section;
   a detector for detecting a light intensity distribution on a focal plane of said optical system; and an adjustor for varying the light intensity distribution on the focal plane based on the detection information of said detector to maximize the uniformity of the light intensity distribution, wherein, the adjustor provides an adjustment to said optical system, and the adjustor provides an adjustment to an output of said light source section independently of said optical system, by adjusting said plurality of laser beams individually based on characteristic data of corresponding lasers stored in advance and detection data of profiles of individual lasers by said detector.

2. The illumination apparatus according to claim 1, wherein the adjustment to said optical system comprises changing the position or the posture of an optical element which composes said optical system.

3. The illumination apparatus according to claim 2, wherein said optical system includes a front group formed from a lens array and a relay lens system of a rear group, and said adjustor changes the position of a component lens of said rear group along an optical axis to vary an overlapping state of images formed by said lens array.

4. An image production apparatus, comprising:

a light source section including a laser light source;

an optical system into which a plurality of laser beams are introduced from said light source section;

an optical modulation element used for modulation of light from said optical system;

a detector for detecting a light intensity distribution of illumination light on said optical modulation element or projection light after passing said optical modulation element; and an adjustor for varying the light intensity distribution of the illumination light on said optical modulation element based on the detection information of said detector to maximize the uniformity of the light intensity distribution, wherein, the adjustor provides an adjustment to said optical system, and the adjustor provides an adjustment to an output of said light source section independently of said optical system, by adjusting said plurality of laser beams individually based on characteristic data of corresponding lasers stored in advance and detection data of profiles of individual lasers by said detector.

5. The image production apparatus according to claim 4, wherein the adjustment to said optical system comprises changing the position or the posture of an optical element which composes said optical system.

6. The image production apparatus according to claim 5, wherein said optical system includes a front group formed from a lens array and a relay lens system of a rear group, and said adjustor changes the position of a component lens of said rear group along an optical axis to vary an overlapping state of images formed by said lens array.

7. An illumination light profile controlling method adapted, where a plurality of laser beams are obtained from a light source section including a laser light source and are outputted through an optical system, to maximize the uniformity of the light intensity distribution on a focal plane of said optical system, comprising the steps of:

acquiring detection information of the light intensity distribution on the focal plane;

varying the light intensity distribution by adjustment of said optical system and by adjustment of output powers of said laser light source independently of said optical system by varying outputs of said plurality of laser beams individually based on characteristic data of the corresponding lasers stored in advance and detection data of profiles of individual lasers by said detector.

* * * * *